United States Patent
Bazzi et al.

(10) Patent No.: US 9,184,813 B2
(45) Date of Patent: Nov. 10, 2015

(54) METHOD FOR REDUCING INTERFERENCE AT A TERMINAL OF A WIRELESS CELLULAR NETWORK, WIRELESS CELLULAR NETWORK, NODE AND CENTRAL NODE OF A WIRELESS NETWORK

(71) Applicant: NTT DOCOMO, Inc., Chiyoda-ku, Tokyo (JP)

(72) Inventors: Samer Bazzi, Munich (DE); Guido Dietl, Munich (DE); Wolfgang Utschick, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 13/857,440

(22) Filed: Apr. 5, 2013

(65) Prior Publication Data
US 2013/0237261 A1 Sep. 12, 2013

Related U.S. Application Data

(63) Continuation of application No. PCT/EP2013/052292, filed on Feb. 6, 2013.

(30) Foreign Application Priority Data

Feb. 13, 2012 (EP) .................................. 12155149

(51) Int. Cl.
*H04B 7/00* (2006.01)
*H04B 7/04* (2006.01)
*H04L 25/03* (2006.01)
*H04B 17/345* (2015.01)

(52) U.S. Cl.
CPC ............ *H04B 7/0456* (2013.01); *H04B 17/345* (2015.01); *H04L 25/03343* (2013.01); *H04B 7/0465* (2013.01)

(58) Field of Classification Search
CPC .......................... H04B 7/0456; H04B 7/0452
USPC ......... 455/501, 67.13, 500, 63.1, 63.4, 67.11, 455/452.2; 370/252, 329
See application file for complete search history.

(56) References Cited

U.S. PATENT DOCUMENTS

2011/0045782 A1* 2/2011 Shin et al. ................... 455/67.13
2011/0287790 A1* 11/2011 Haustein et al. ............. 455/500
2013/0182672 A1* 7/2013 Kakishima et al. ........... 370/329

OTHER PUBLICATIONS

International Search Report and Written Opinion of the International Searching Authority in corresponding International Application No. PCT/EP2013/052292, dated Mar. 21, 2013, 13 pages.
El Ayach, Omar et al., "The Feasibility of Interference Alignment Over Measured MIMO-OFDM Channels," IEEE Transactions on Vehicular Technology, vol. 59, No. 9, Nov. 2010, pp. 4309-4321.
Gomadam, Krishna et al., "Approaching the Capacity of Wireless Networks through Distributed Interference Alignment," IEEE Global Telecommunications Conference (GLOBECOM), 2008, 10 pages.
Peters, Steven W. et al., "Interference Alignment Via Alternating Minimization," IEEE International Conference on Acoustics, Speech and Signal Processing (ICASSP), 2009, pp. 2445-2448.

* cited by examiner

*Primary Examiner* — John Lee
(74) *Attorney, Agent, or Firm* — Brinks Gilson & Lione

(57) ABSTRACT

A method for reducing interference at a terminal of a wireless cellular network is described. The terminal experiences interference from a plurality of interfering nodes in the wireless cellular network. The method includes selecting the precoders of the interfering nodes such that the sum of distances between the interference projector matrices for the terminal is minimized.

21 Claims, 7 Drawing Sheets

```
Initial F_l ∀l
repeat
  Original network:
  for k = 1 to K do
    Calculate interference covariance matrix Q_k (cf. (8))
    Find the receive filter G_k that minimizes I_k (cf. (9))
  end
  Reciprocal network:
  for k = 1 to K do
    Calculate interference covariance matrix Q_k^r
    Find the receive filter G_k^r (F_k) that minimizes I_k^r
  end
until convergence is reached
```

Inerference Alignment via Minimizing Interference Leakage

FIG 3

```
Initial F_l ∀l
repeat
  Original network:
  for k = 1 to K do
    for j = 1 to d do
      Calculate interference plus noise covariance matrix B_{k,j} (cf. (12))
      Find G_k^{:,j} that maximizes SINR_{k,j} (cf. (13))
    end
  end
  Reciprocal network:
  for k = 1 to K do
    for j = 1 to d do
      Calculate interference plus noise covariance matrix B_{k,j}^r
      Find G_k^{:,j,r}(F_k^{:,j}) that maximizes SINR_{k,j}^r
    end
  end
until convergence is reached
```

The Max-SINR Algorithm

FIG 4

Initial X with orthonormal columns. Step size $\gamma = 1$.
1) Calculate $D_{X^*}$, the derivative of f w.r.t. $X^*$.
2) Compute the steepest direction $Z = -(I_M - XX^H)D_{X^*}$.
3) Calculate $<Z, Z> = tr(Z^H Z)$. If it is sufficiently small, then stop.
4) If $f(X) - f(X+2\gamma Z) \geq \gamma <Z, Z>$ then set $\gamma = 2\gamma$ and repeat step 4.
5) If $f(X) - f(X+\gamma Z) < 0.5\gamma <Z, Z>$ then set $\gamma = 0.5\gamma$ and repeat step 5.
6) Set $X = qf_d \{X + \gamma Z\}$. Go back to step 1.

The Modified Steepest Descent on the Grassmann Manifold

FIG 6

Initial $F_l \ \forall l$ (initial $P_{kl} \ \forall k \neq l$)
repeat
   for $l = 1$ to K do
      Find $F_l$, the minimizer of $\alpha_{upper,l}$, using the steepest descent method
      on the complex Grassmann manifold (cf. Appendix C)
      Update $P_{kl} \ \forall k \neq l$ (cf. (16))
   end
until convergence is reached Algorithm 3: Interference Alignment via Minimizing Projector Distances of Interfering Subspaces

FIG 7

Effect of using ZF vs. MMSE filters on performance

Effect of WF on performance

METHOD FOR REDUCING INTERFERENCE AT A TERMINAL OF A WIRELESS CELLULAR NETWORK, WIRELESS CELLULAR NETWORK, NODE AND CENTRAL NODE OF A WIRELESS NETWORK

RELATED APPLICATIONS

This application is a continuation of PCT/EP2013/052292 filed on Feb. 6, 2013, which claims priority to European Application No. 12155149.3 filed on Feb. 13, 2012. The entire contents of these applications are incorporated herein by reference.

BACKGROUND OF THE INVENTION

The present invention relates to the field of wireless cellular networks, more specifically to an approach for reducing interference of a terminal of such a wireless cellular network using interference alignment via minimizing projector distances of interfering subspaces.

FIG. 1 shows a schematic representation of a wireless cellular network comprising K cells, each cell including a respective base station BS serving one or more terminals or user equipment UE in the cell. FIG. 1 is a schematic representation and only one user equipment UE is shown in each cell, however, it is noted that a base station BS of a cell may serve a plurality of user equipment UE, like mobile phones. In FIG. 1 an exemplary case of a downlink transmission in a multi-cell MIMO/CoMP system (MIMO=Multiple Input Multiple Output; CoMP=Coordinated Multi-Point) is shown. The base stations BSs employ joint precoding to reduce/cancel inter-cell interference for the users UE, especially for cell-edge users $UE_1$ to $UE_K$ as depicted in FIG. 1. Each base station provides for a direct link to the user equipment it serves, as is indicated by the solid line arrow. In addition, especially cell-edge users experience interference from other base stations as indicated by the dotted arrows in FIG. 1. For example, in cell 2 user or user equipment $UE_2$ is located close to an edge of the cell, thereby also experiencing interference from the base station $BS_1$ and the base station $BS_K$ in cells 1 and K, respectively. The base stations of the network or at least a number of the base stations are connected via a backhaul network having a central node CN.

FIG. 2 is a schematic representation of the channels or links between the respective base stations BSs and the user equipment UEs, wherein the direct links and the interfering links together with the associated channel matrices H are shown. Each base station uses a precoder $F_1$ to $F_K$, wherein by means of joint precoding, the inter-cell interference, especially for cell-edge users may be reduced or even canceled. At the user equipments, respective receive filters $G_1$ to $G_K$ are used. For obtaining the reduction or cancelation of the inter-cell interference the precoders $F_1$ to $F_K$ need to be designed such that the rate of the edge-users is maximized. Designing the precoders and the receive filters separately, in general, leads to a suboptimal solution and consequently to low user rates. Further, there are no easy analytical solutions due to the complexity of the problem. In known technology, some approaches for maximizing user rates in a wireless network are described by K. Gomadam, V. R. Cadambe and S. A. Jafar, "Approaching the Capacity of Wireless Networks through Distributed Interference Alignment", in IEEE Global Telecommunications Conference (GLOBECOM), 2008. Two algorithms for maximizing user rates are described, the so-called interference leakage algorithm and the so-called Max-SINR algorithm. The goal of the interference leakage algorithm is to minimize interference power at the receivers which is obtained by a joint design of the precoding and receive matrices. While the performance obtained is good, i.e. the data rates obtained are good, the computational complexity is high and it is necessitated to have knowledge about the interfering links at the base stations. The Max-SINR algorithm has the goal to maximize the signal-to-interference-ratio at the receivers. Also, in this algorithm the precoding and receiving matrices are jointly designed. The performance, i.e. the obtainable data rates, is better when compared to the interference leakage algorithm, however, the computational complexity is higher and global channel knowledge needs to be available at the base stations, i.e. knowledge about the interfering links and the direct links.

Thus, with conventional approaches it is necessitated to design precoders and receive filters jointly which is a mathematically complex problem and, in addition, the receive filters need to be re-calculated every time the precoders change. Further, the obtained receive filters may have a complex structure (which is hard to calculate), and which cannot be employed in real scenarios/standards where MMSE or IRC filters (MMSE=minimum mean-square-error; IRC=interference-rejection-combining) are used. In the following, further details of the above described conventional approaches will be given.

When transmitters and receivers have multiple antennas, interference alignment (IA) approaches may be used. Interference alignment is based on the idea that unintended interference at each receiver can be forced to lie in only a subspace of the received signal; thus leaving another interference-free subspace which can be used for intended signal transmission. For example, if a receiver has two antennas, the unintended interference can be forced to lie in a one-dimensional subspace, leaving another subspace (also a one-dimensional subspace) to be interference-free. Interference alignment may be of specific interest when the antenna configuration of the system (the number of transmit and receive antennas) does not allow for a zero-forcing precoder design in accordance with which interference is pre-canceled at the transmitter side. In such a case IA offers an attractive alternative by first aligning the interference at each receiver by proper precoding at the transmitter side and then applying zero-forcing receive filters in order to cancel it.

In the following description, a system model will be considered having a K-user MIMO interference channel (IC) with K≥3 and where a user denotes a transmitter/receiver pair. This corresponds to K cells with K cell-edge users which are served using the same resource blocks; thus, each cell-edge user experiences interference from K−1 cells. Each transmitter is equipped with M antennas while each receiver is equipped with N antennas. A receiver desires to receive $1 \leq d < \min(N, M)$ data symbols (streams). Prior to transmission, the data symbols $s_k \sim N_J(0, I_d) \in \mathbb{C}^d$ are precoded at a transmitter k by the linear precoder $F_k \in \mathbb{C}^{M \times d}$, are sent over the direct channel $H_{kk} \in \mathbb{C}^{N \times M}$, and are received by receiver k. Each transmitter k has a transmit power constraint $E[\|F_k s_k\|_2^2] = tr(F_k^H F_k) = E_{tx,l}$. At the receiver k the obtained signal is perturbed by noise $n_k \sim N_C(0, C_{n_k}) \in \mathbb{C}^N$ in addition to unintended interference coming from other transmitters l≠k. A receive filter $G_k \in \mathbb{C}^{N \times d}$ is employed to reduce or cancel the interference and/or maximize the achievable rate. The estimates of the data symbols received at the receiver k via the direct channel from transmitter k are given as follows:

$$\hat{s}_k = G_k^H \left( H_{kk} F_k s_k + \sum_{l=1, l \neq k}^{K} H_{kl} F_l s_l + n_k \right) \quad (1)$$

where $H_{kl} \in \mathbb{C}^{N \times M}$ denotes the channel between the receiver k and the transmitter l. Conventionally, it is assumed that rank $(H_{kl})=\min(N, M)$, $\forall k, l$. In the present case, this constraint is relaxed to $(H_{kl}) \geq d$.

The total achievable rate of all users R is given by:

$$R = \sum_{k=1}^{K} R_k,$$

where $R_k$ is the achievable rate of user k. Equation (1) may be rewritten as follows:

$$\hat{s}_k = \hat{H}_k s_k + \sum_{l=1, l \neq k}^{K} \hat{H}_{int,l} s_l + G_k^H n_k, \quad (2)$$

where $\hat{H}_k = G_k^H H_{kk} F_k$ and $\hat{H}_{int,l} = G_k^H H_{kl} F_l$ denote the effective direct channel between the k-th transmitter/receiver pair and the effective interfering channel between the transmitter l and receiver k, respectively. $R_k$ can then be written as follows:

$$R_k = \log_2 \det \left( I_d + \hat{H}_k \hat{H}_k^H \left( \sum_{l=1, l \neq k}^{K} \hat{H}_{int,l} \hat{H}_{int,k}^H + G_k^H C_{n_k} G_k \right)^{-1} \right) \quad (3)$$

In order to achieve interference alignment (IA) the following two conditions has to hold:

$G_k^H H_{kl} F_l = 0, \forall l \neq k$ $\text{rank}(G_k^H H_{kk} F_k) = d. \quad (4)$ The first condition simply states that interference from all unintended transmitters should be suppressed, while the second one states that the design of the precoders and the receive filters needs to ensure the existence of an effective interference-free channel between the k-th transmitter/receiver pair where d data symbols (streams) can be simultaneously communicated.

The above-mentioned two conventional methods/algorithms for maximizing user rates in a wireless network will now be described in further detail. Both methods are based on the concept of network reciprocity, a concept which holds for Time Division Duplex (TDD) based systems. Due to the reciprocity, the signaling dimensions along which a receiving node sees the least interference from transmit signals are also the same dimensions along which the node will cause the least interference to other nodes in the reciprocal network where the roles of transmitters and receivers are switched. Moreover, the concept of reciprocity implies that the channel between the receiver l and the transmitter k in the reciprocal network $H_{lk}^r$ is related to the channel between the receiver k and the transmitter l in the original network as follows:

$H_{lk}^r = H_{kl}^H \quad (5)$

Additionally, when defining $F_k^r$ and $G_k^r$ to be the precoding and receive filters of user k in the reciprocal network. The IA conditions can be written as follows:

$G_l^{r,H} H_{lk}^r F_k^r = 0, \forall k \neq l$ $\text{rank}(G_k^{r,H} H_{kk}^r F_k^r) = d. \quad (6)$ As can be seen, when setting $F_k^r = G_k$ and $G_k^r = F_k$, equation (6) becomes equivalent to equation (4) which tells that the alignment is reciprocal. Thus, alignment in the reciprocal networks can be achieved if it can be achieved in the original network, and interference alignment in the reciprocal network can be achieved by choosing the precoding and receive filters of the reciprocal network to be the receive and precoding filters of the original network.

In accordance with this interference alignment method the signals are not separated in space; rather, at each step of the algorithm, it is tried to minimize the interference leakage (power) at each receiver such that the first condition of equation (4) is fulfilled when the algorithm converges. If interference power is zero, then interference coming from undesired transmitters is implicitly aligned to a smaller dimension. The interference leakage $I_k$ of receiver k in the original network due to all transmitters $l \neq k$ is defined as:

$$I_k = tr[G_k^H Q_k G_k], \quad (7)$$

where $$Q_k = \sum_{l=1, l \neq k}^{K} \frac{E_{tx,l}}{d} H_{kl} F_l F_l^H H_{kl}^H \quad (8)$$

is the interference covariance matrix of receiver k. For given precoders, the columns of the receive filter that minimizes $I_k$ are the eigenvectors corresponding to the d smallest eigenvalues of $Q_k$, that is:

$$G_k^{:,l} = v_l(Q_k), \quad (9)$$

where $vl(Q_k)$ is the eigenvector corresponding to the l-th smallest eigenvalue of $Q_k$ and $G_k^{:,l}$ is the l-th column of $G_k$. In the reciprocal network, the interference leakage $I_k^r$ is defined as follows:

$$I_k^r = tr[G_k^{r,H} Q_k^r G_k^r], \quad (10)$$

where $$Q_k^r = \sum_{l=1, l \neq k}^{K} \frac{E_{tx,l}}{d} H_{kl}^r F_l^r F_l^{r,H} H_{kl}^{r,H} = \sum_{l=1, l \neq k}^{K} \frac{E_{tx,l}}{d} H_{lk}^H G_l G_l^H H_{lk}$$

is the interference covariance matrix of receiver k. Similarly, the columns of the receive filter that minimizes $I_k^r$ are the eigenvectors corresponding to the d smallest eigenvalues of $Q_k^r$.

The algorithm alternates between the original and reciprocal networks. Within each network the receivers update their receive filters such that the interference leakage is minimized. Arbitrary initial orthonormal precoders may be chosen as a starting point, and details of the algorithm for interference alignment via minimizing interference leakage are depicted in FIG. 3.

For implementing this algorithm, the channel state information (CSI) between receivers and undesired transmitters need to be available (i.e., the quantities $H_{kl}$, $\forall k$, $\forall l \neq k$). The CSI of the direct links is not needed. To achieve IA, an alternating optimization over both the precoding and receive filters is performed; with the precoders fixed, the receive filters are updated, and vice versa. An implementation of the algorithm in a distributed fashion can be realized as follows:

(1) To update the receive filters, the precoders are exchanged between the transmitters and channel matrices of the original network are used in the optimization process.

(2) To update the precoders, the receive filters are exchanged between the transmitters and the channel matrices of the reciprocal network are used in the optimization process.

For this approach it is assumed that the transmitters are responsible for calculating the receive filters which will be signaled to the receivers after the algorithm converges.

The second algorithm, the Max-SINR algorithm, aims at directly maximizing the Signal-to-Interference-Noise (SINR) ratio of each desired transmitted stream. When compared to the first algorithm, which tries to perfectly align interference in a lower dimensional subspace, the Max-SINR algorithm tries to maximize the desired signal power within the desired signal space. The SINR of the j-the stream of the k-the receiver in the original network is defined as follows:

$$SINR_{k,j} = \frac{G_k^{:,j,H} H_{kk} F_k^{:,j} F_k^{:,j,H} H_{kk}^H G_k^{:,j}}{G_k^{:,j,H} B_{k,j} G_k^{:,j}} \frac{E_{tx,k}}{d} \quad (11)$$

where $F_k^{:,j}$ is the j-th column of $F_k$ and $B_{k,j}$ is the interference plus noise covariance matrix of the j-th stream of the k-th receiver:

$$B_{k,j} = \sum_{l=1}^{K} \frac{E_{tx,l}}{d} \sum_{u=1}^{d} H_{kl} F_l^{:,u} F_l^{:,u,H} H_{kl}^H - \frac{E_{tx,k}}{d} H_{kk} F_k^{:,j} F_k^{:,j,H} H_{kk}^H + C_{n_k} \quad (12)$$

With this definition, the unit vector $G_k^{:,j}$ that maximizes $SINR_{k,j}$ is given by:

$$G_k^{:,j} = \frac{B_{k,j}^{-1} H_{kk} F_k^{:,j}}{\|B_{k,j}^{-1} H_{kk} F_k^{:,j}\|_2}. \quad (13)$$

A similar analysis is done in the reciprocal network; for brevity, it is skipped and the Max-SINR algorithm is shown in further detail in FIG. 4.

This algorithm necessitates global channel knowledge to be implemented, i.e., every transmitter should know the CSI of both the direct links and the interfering links. When compared to the first algorithm, this is a big signaling overhead. For example, for a system of K=3 transmitter/receiver pairs, this constitutes a 50% additional overhead (9 channels need to be communicated from the receivers to the transmitters in total instead of 6 channels in the first algorithm). This algorithm can be implemented in a distributed fashion where the precoders and receive filters are iteratively exchanged between the transmitters, similar to the first algorithm. Similar to the first algorithm, an alternating optimization over both the precoding and receive filters may be performed.

The above description shows that the conventional approaches are disadvantageous because the precoders and receive filters are jointly designed resulting in the necessity to solve mathematically complex problems and, further, receive filters need to be re-calculated every time a precoder changes. Further, the receive filters will have a complex structure which is hard to calculate so that they cannot easily be used in real scenarios/standards.

SUMMARY OF THE INVENTION

According to an embodiment, a method for reducing interference at a terminal of a wireless cellular network, the terminal experiencing interference from a plurality of interfering nodes in the wireless cellular network, may have the step of: selecting the precoders of the interfering nodes such that the sum of distances between the interference projector matrices for the terminal is minimized.

Another embodiment may have a non-transitory computer program product including instructions stored on a machine-readable medium for performing the inventive method, when the instructions are executed on a computer.

According to another embodiment, a wireless cellular network may have: a plurality of nodes; and a terminal experiencing interference from at least some of the plurality of nodes, wherein the wireless cellular network is configured to provide for a selection of the precoders of nodes interfering with the terminal such that the sum of distances between the interference projector matrices for the terminal is minimized.

Another embodiment may have a node of a wireless cellular network, wherein the wireless cellular network includes a terminal experiencing interference from the node and from one or more other interfering nodes in the network, wherein the precoders of the interfering nodes are selected such that the sum of distances between the interference projector matrices for the terminal is minimized, and wherein, after each iteration, the node is configured to calculate its precoder, to update its projector matrix accordingly, and to signal its updated projector matrix to all other interfering nodes.

Another embodiment may have a central node for a wireless cellular network including a plurality of nodes, a backhaul network connecting the plurality of nodes and the central node, and a terminal experiencing interference from a plurality of interfering nodes in the wireless cellular network, wherein the central node is configured to select the precoders of the interfering nodes such that the sum of distances between the interference projector matrices for the terminal is minimized.

Embodiments of the invention provide a method for reducing interference at a terminal of a wireless cellular network, the terminal experiencing interference from a plurality of interfering nodes in the wireless cellular network, the method comprising selecting the precoders of the interfering nodes such that the sum of distances between the interference projector matrices for the terminal is minimized.

In accordance with embodiments the interference projector matrix may correspond to a unique receive interference subspace between the terminal and the interfering node. The interference projector matrix may be a function of the precoder matrix of the interfering node and the channel matrix of the channel from the interfering node to the terminal.

In accordance with embodiments the interference projector matrix corresponding to an interference subspace between an interfering node l and a terminal k may be the orthogonal projector onto the column space of $H_{kl}F_l$, wherein $H_{kl}$=channel matrix of the channel between the interfering node l and the terminal k, and $F_l$=precoder matrix of the interfering node l. The interference projector matrix may be determined by $$P_{kl} = H_{kl}F_l(F_l^H H_{kl}^H H_{kl} F_l)^{-1} F_l^H H_{kl}^H.$$

The wireless cellular network may comprise a plurality of terminals, wherein the precoders are designed such that the sum of distances of the interference projector matrices over all terminals is minimized. The precoders of the interfering nodes may be designed as follows:

$$(F_1, \ldots, F_K) = \underset{(F_1,\ldots,F_K)}{\operatorname{argmin}} [\text{sum of distances of interference projector}$$

$$\text{matrices over all terminals}]$$

$$= \underset{(F_1,\ldots,F_K)}{\operatorname{argmin}} \sum_{k=1}^{K} \sum_{l=1, l \neq k}^{K} \sum_{m=1, m \neq \{l,k\}}^{K} \|P_{kl} - P_{km}\|_2$$

wherein $F_1, \ldots, F_K$=precoder matrices of interfering nodes 1 to K, $P_{kl}$=interference projector matrix corresponding to an interference subspace between an interfering node l and a terminal k, $P_{km}$=interference projector matrix corresponding to an interference subspace between an interfering node m and the terminal k, $\|P_{kl}-P_{km}\|_2$=distance between interference projector matrices.

In accordance with embodiments the receive interference subspaces may be adjusted iteratively until an alignment of the receive interference subspace is reached. The precoders may be calculated by an alternating minimization algorithm, wherein at each iteration one precoder is calculated using a predefined method and its corresponding projector matrices are updated, wherein the next precoder is calculated based on the updated projector matrices, until convergence. For fixed precoders $F_m \forall m \neq l$, an optimal precoder $F_{l,opt}$ is chosen as follows:

$$F_{l,opt} = \underset{F_l}{\operatorname{argmin}} \sum_{k \neq l} \sum_{m \neq \{l,k\}} \|P_{kl} - P_{km}\|_F^2$$

wherein index k refers to the receivers/terminals, while indices l,m refer to the transmitters/interfering nodes, wherein projector matrix $P_{kl}$ depends on precoder $F_l$, and wherein $P_{km}$ depends on precoder $F_m$, and wherein $\|P_{kl}-P_{km}\|_F$ is the Frobenius norm of $P_{kl}-P_{km}$.

The nodes may be connected over a backhaul network, and the iterative calculation may be performed in a central node of the wireless cellular network, or wherein the iterative calculation may be distributed over a plurality of nodes of the wireless cellular network.

In accordance with embodiments a receive filter in the terminal may be selected independent of the design of the precoders at the interfering nodes. Dependent on the network specification, a minimum mean-square-error (MMSE), an interference-rejection-combining (IRC) or a zero-forcing (ZF) receiving filter may be chosen.

Embodiments of the invention provide a non-transitory computer program product comprising instructions stored on a machine-readable medium for performing the inventive method, when the instructions are executed on a computer.

Embodiments of the invention provide a wireless cellular network, comprising a plurality of nodes, and a terminal experiencing interference from at least some of the plurality of nodes, wherein the wireless cellular network is configured to provide for a selection of the precoders of nodes interfering with the terminal such that the sum of distances between the interference projector matrices for the terminal is minimized. The wireless cellular network may comprise a backhaul network connecting the plurality of nodes, wherein the plurality of nodes are adapted to provide for a calculation of the precoders distributed among the plurality of nodes. The wireless circular network may comprise a central node; and a backhaul network connecting the plurality of nodes and the central node, wherein the central node is configured to provide for a centralized calculation of the precoders for the interfering nodes.

Embodiments of the invention provide a node of a wireless cellular network, wherein the wireless cellular network comprises a terminal experiencing interference from the node and from one or more other interfering nodes in the network, wherein the precoders of the interfering nodes are selected such that the sum of distances between the interference projector matrices for the terminal is minimized, wherein the node is configured to calculate its precoder and to update its projector matrix accordingly; and wherein the node is configured to signal its updated projector matrix to the one or more other interfering nodes.

Embodiments of the invention provide a central node for a wireless cellular network comprising a plurality of nodes, a backhaul network connecting the plurality of nodes and the central node, and a terminal experiencing interference from a plurality of interfering nodes in the wireless cellular network, wherein the central node is configured to select the precoders of the interfering nodes such that the sum of distances between the interference projector matrices for the terminal is minimized.

With regard to the term "node" (base station) as used it is noted that this is considered as an interfering node for one or more terminals. In case the base station is an interfering node for more than one terminal, it is necessitated to calculate also a plurality of projector matrices.

Thus, in accordance with the present invention a novel approach for suppressing interference at a mobile terminal, for example at an edge-user, in a wireless cellular network is presented, whereas, contrary to the conventional approaches, interference alignment is obtained without the need for taking "action" at both "ends" of the transmission path, i.e., both at the interfering base station and at the receiver, rather in accordance with the inventive approach it is sufficient to select the precoders at the interfering base station in such a way that in the distance between the interference projector matrices for the terminal is minimized. The novel interference alignment (IA) algorithm achieves IA with a precoder design only. A new formulation with more geometrical insights to the IA problem is presented. The design based on the precoders simplifies the problem structure extensively and allows receive filters to be designed independently and irrespectively of the IA conditions. Simulation results show that the proposed scheme results in higher data rates for cell-edge users (given the same CSI knowledge assumption) with less signaling overhead.

The inventive approach provides a new formulation to the IA problem in terms of the precoding matrices only. The subspace occupied by the interference from an undesired base station is modeled with a projector matrix, also called "interference projector". This projector matrix implicitly depends on a precoder of the undesired base station. There is a one-to-one correspondence between a subspace and its projector matrix, i.e., for each subspace there is a unique corresponding projector matrix. If at one UE, the distance between two interference projectors (corresponding to two interfering signals from two different base stations) is zero, these subspaces are aligned, and interference is aligned into one subspace. With these definitions, the precoders of the different base stations are optimized such that the sum of distances of interference projectors over all receivers is minimized. An optimized solution gives a sum of zero. The solution to the problem is found in an iterative manner where at each iteration, one precoder is calculated, its corresponding projector matrices are updated and communicated to the other base stations, and this process is repeated until convergence.

In accordance with the inventive approach, the receive filters are not part of the optimization process; this additional degree of freedom allows to freely select the receive filters according to the scenario at hand. In accordance with embodiments, it may be necessitated to have knowledge of the CSI (Channel State Information) of the interfering links.

The inventive approach is advantageous as it allows separating the design of the precoders and the receive filters without any degradation in performance. It even results in higher achievable user rates for edge-users given the same CSI knowledge assumption. Since the receive filters are independent of the precoders or the precoding filters, simple minimum means squared error (MMSE) or interference rejection combining (IRC) filters may be used, as they are, for example, specified in the standard. In contrast, state-of-the-art methods necessitate the use of complex receive filters which makes these methods hard to implement in real scenarios. Further, the inventive approach is advantageous as it results in a reduced signaling overhead over the air-link.

BRIEF DESCRIPTION OF THE DRAWINGS

Embodiments of the present invention will be detailed subsequently referring to the appended drawings, in which:

FIG. 3 shows an algorithm for interference alignment via minimizing interference leakage;

FIG. 4 shows the Max-SINR algorithm;

FIG. 5 shows a schematic representation of a part of a wireless cellular network, wherein

FIG. 6 shows the modified steepest descent algorithm on the Grassmann manifold;

FIG. 7 shows the algorithm for interference alignment via minimizing projector distances of different subspaces in accordance with an embodiment of the invention;

DETAILED DESCRIPTION OF THE PREFERRED EMBODIMENTS

In accordance with the inventive approach, rather than defining precoders and receive filters for the base stations and the receivers jointly, in accordance with the inventive approach a separate design of precoders and receive filters without any degradation and system performance is performed. This is done by using the concept of interference alignment and by designing the precoders such that the interfering signals at each user equipment coming from different base stations have the same direction of arrival as the user equipment so that multiple interference signals overlap.

Figure 1:
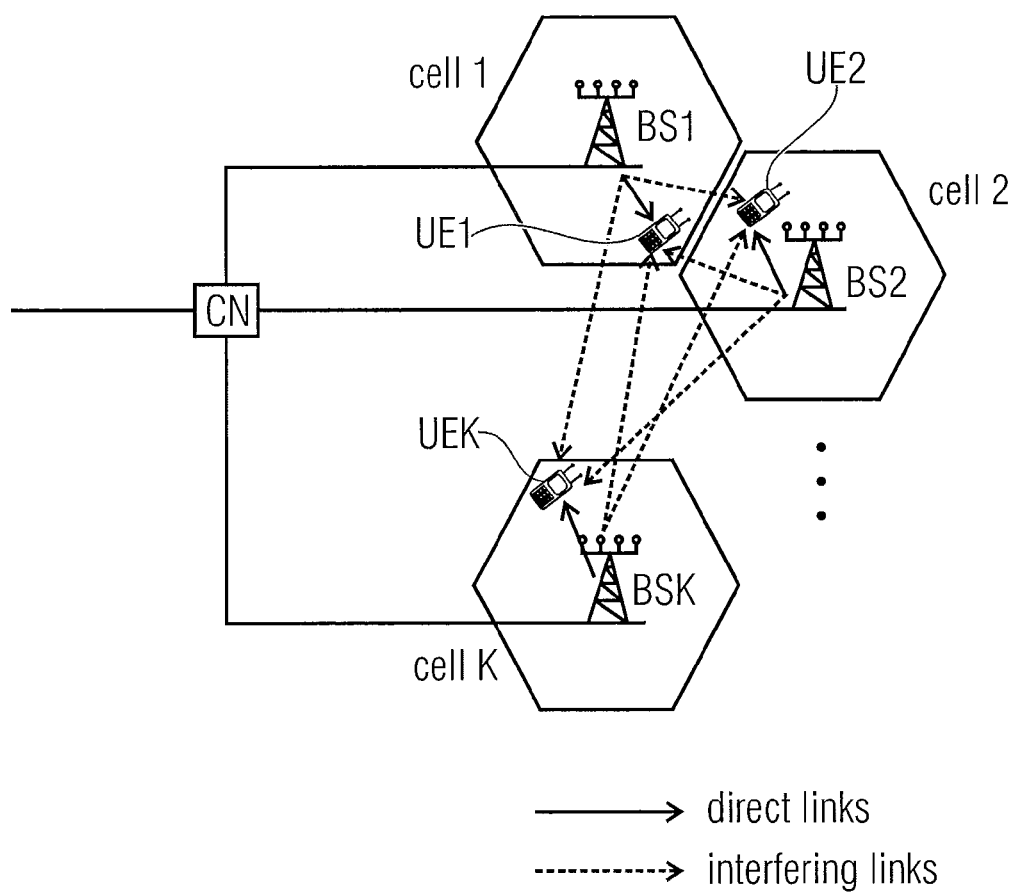
FIG. 1 shows a schematic representation of a wireless cellular network comprising K cells.
Figure 2:
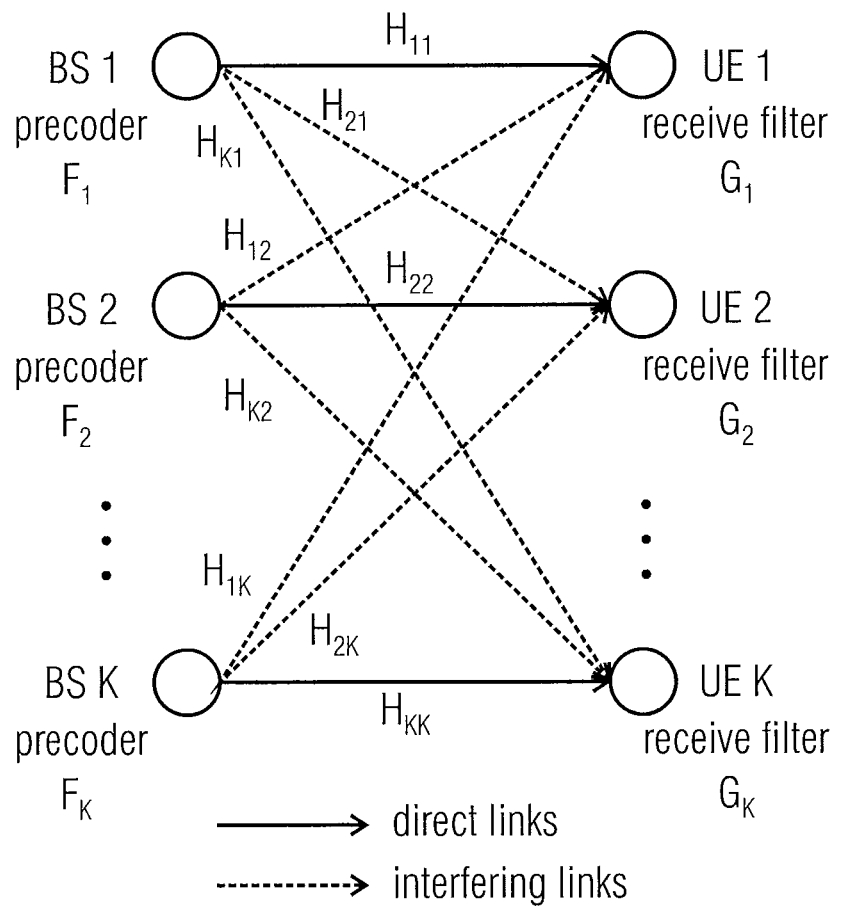
FIG. 2 is a schematic representation of the direct links and the interfering links between the base stations BSs and the user equipment UEs of FIG. 1.
Figure 5B:
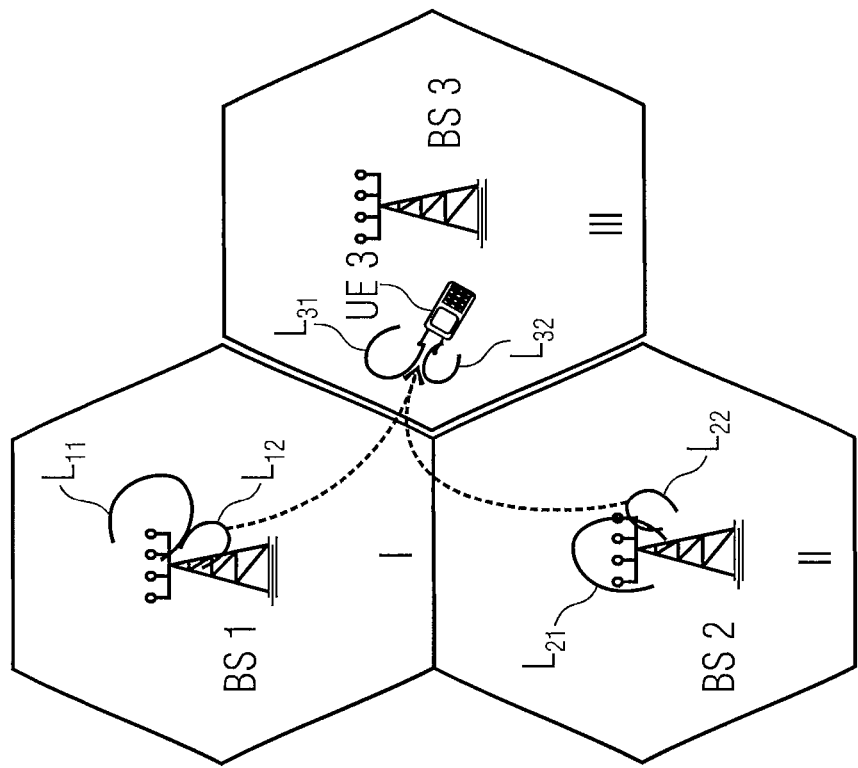
FIG. 5B shows the network after the IA design.
Figure 5A:
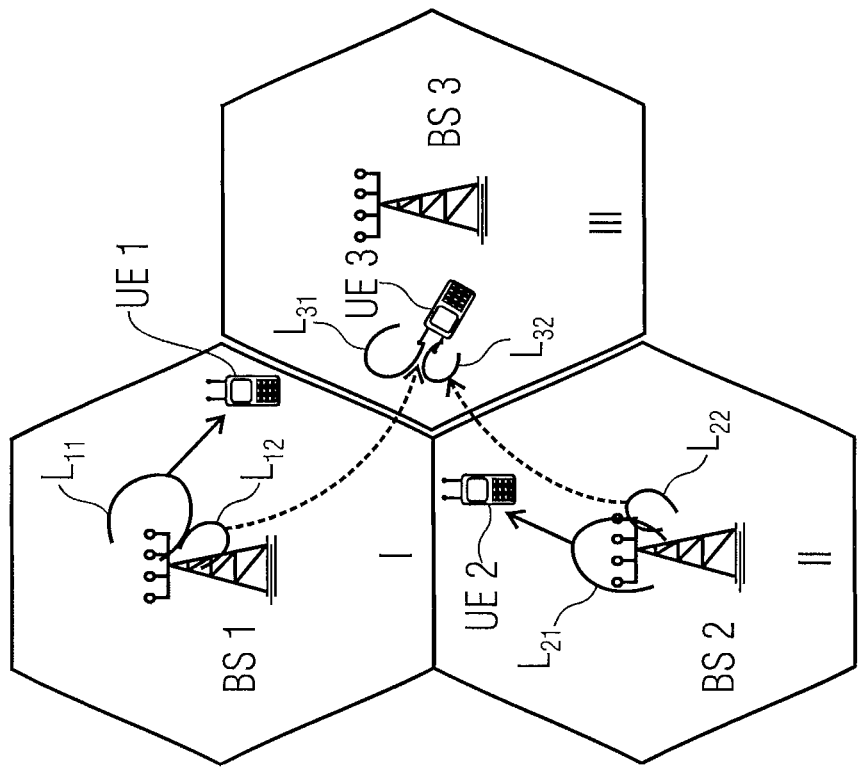
FIG. 5A shows the network before the IA design.

FIG. 5 shows a schematic representation of a part of a wireless cellular network on the basis of which the concept of interference alignment is described, wherein FIG. 5A shows the network before the IA design, and FIG. 5B shows the network after the IA design. As is shown in FIG. 5, the schematically represented network comprises three cells I-III, each including a base station BS1 to BS3. In FIG. 5A in each cell a respective user UE1 to UE3 is depicted. The users are located close to an edge of the respective cells, i.e. the users UE1 to UE3 are considered cell-edge users. In the following, the user UE3 in cell III is considered with regard to interference signals received from base stations BS1 and BS2. In FIG. 5A the interfering signals from the respective base stations are shown as dotted arrows. Further, for base stations BS1 and BS2 a graphical/spatial representation of the precoding at the respective base station is indicated by lobes L11 to L22. The precoding at base station BS1 and at base station BS2 ensure that the respective users UE1 and UE2, respectively, are served by the base stations, as is shown by the solid line arrows. At user UE3 the filtering is also graphically/spatially represented by the lobes L31 and L32. It is noted that the lobes shown in FIG. 5 are an illustrative example when the UE has two antennas (and therefore two lobes). For example, when a UE has three antennas, there would be three lobes.

In FIG. 5A shows a situation without interference alignment. The precoding at the base stations BS1 and BS2, and the filtering at user UE3 is such that for example only the interfering signal from base station BS1 can be canceled at the user UE3, whereas an interference signal from base station BS2 cannot be canceled.

When applying the concept of interference alignment, the precoders are designed in such a way that the interfering signals at the user coming from different base stations have the same direction, an approach that is schematically shown in FIG. 5B showing the network of FIG. 5A after applying the concept of interference alignment. As can be seen from a comparison of FIGS. 5A and 5B by designing the precoders in accordance with the concept of interference alignment, the interfering signals from both base stations BS1 and BS2 now have the same direction of arrival at the user equipment UE3, and when compared to FIG. 5A the interference signal from the second base station BS2 now arrives in the same direction as the interference signal from the base station BS1 so that it is now possible to cancel both interfering signals from both base stations BS1 and BS2. In other words, at the user UE3 the multiple interfering signals now appear as one signal so that they can easily be canceled.

In accordance with the inventive approach, this interference alignment operates such that the precoders at the base stations are designed such that the sum of the distances of the interference of the interference projector matrices of all user equipment is minimized as follows:

$$(F_1, \ldots, F_K) = \operatorname*{argmin}_{(F_1,\ldots,F_K)} [\text{sum of distances of interference projector matrices over all terminals}]$$

$$= \operatorname*{argmin}_{(F_1,\ldots,F_K)} \sum_{k=1}^{K} \sum_{l=1, l \neq k}^{K} \sum_{m=1, m \neq \{l,k\}}^{K} \|P_{kl} - P_{km}\|_2$$

wherein
$F_1, \ldots, F_K$=precoder matrices of interfering nodes 1 to K,
$P_{kl}$=interference projector matrix corresponding to an interference subspace between an interfering node l and a terminal k,
$P_{km}$=interference projector matrix corresponding to an interference subspace between an interfering node m and a terminal k, $\|P_{kl}-P_{km}\|_2$=distance between interference projector matrices.
K=number of base stations.

In accordance with the embodiments, which will be described in further detail below, the precoders are calculated iteratively. Receive filters are excluded from the optimization problems so that it is possible to use any desired receive filters, like MMSE, IRC or ZF filters as they are specified in the standard on the basis of which the cellular network operates.

In the following, an embodiment for interference alignment via minimizing projector distances of interfering subspaces is described in further detail.

Let $S_1$ and $S_2$ be two subspaces with the same dimension, then the distance between $S_1$ and $S_2$ is defined as it is described in G. H. Golub and C. F. Van Loan, Matrix Computations, Johns Hopkins, 1996.

$$d(S_1,S_2)=\|P_1-P_2\|_2, \tag{14}$$

where $P_i$ is the orthogonal projector onto $S_i$, and $\|\cdot\|_2$ the 2-norm of a matrix. The 2-norm of a matrix A is defined as:

$$\|A\|_2=\sigma_{max}(A),$$

which is the maximum singular value of A. Moreover, the following inequalities hold:

$$\|A\|_2 \le \|A\|_F \le \sqrt{n}\|A\|_2, \tag{15}$$

where $\|A\|_F$ is the Frobenius norm of A, and n is the number of columns of the matrix A.

A distance of 0 between two subspaces means that these subspaces are aligned, i.e. they constitute the same identical subspace.

$P_{k,l}$ is defined to be the orthogonal projector onto the column space of $H_{kl}F_l$, $\forall l$, $\forall k \ne l$. $P_{k,l}$ uniquely defines a receive interference subspace between receiver k and transmitter l, and, in accordance with G. H. Golub and C. F. Van Loan, Matrix Computations, Johns Hopkins, 1996, can be written as:

$$P_{kl}=H_{kl}F_l(F_l^H H_{kl}^H H_{kl}F_l)^{-1}F_l^H H_{kl}^H, \tag{16}$$

where $(\bullet)^H$ denotes the conjugate transposition.

$P_{k,l}$ has the following properties which are necessitated later:
1. $P_{kl}=P_{kl}^2$.
2. $P_{kl}=P^{klH}$.
3. $tr(P_{kl})=d$.

The last equality comes from:

$$tr(P_{kl}) = tr\left[H_{kl}F_l(F_l^H H_{kl}^H H_{kl}F_l)^{-1}F_l^H H_{kl}^H\right] = \tag{17}$$

$$tr\left[F_l^H H_{kl}^H H_{kl}F_l(F_l^H H_{kl}^H H_{kl}F_l)^{-1}\right] = tr(I_d) = d,$$

where the identity tr(AB)=tr(BA) which holds for any matrices A and B has been used.

The one-sided interference alignment problem may be formulated as the problem of finding the optimal precoders that minimize the sum of distances between interfering subspaces of all receivers:

$$(F_1, \ldots, F_k)_{opt} = \tag{18}$$

$$\operatorname*{argmin}_{(F_1,\ldots,F_K)} \sum_{k=1}^{K} \sum_{l=1,l \ne k}^{K} \sum_{m=1,m \ne \{l,k\}}^{K} \|P_{kl}-P_{km}\|_2 \text{ s.t. } F_l^H F_l = I_d, \forall l.$$

It will be clear in the subsequent sections why the constraint $F_l^H F_l = I_d$, $\forall l$ is enforced. If interference subspaces are aligned at each receiver, an orthogonal receiver filter to the interfering subspaces can be chosen to satisfy the interference alignment conditions. The receive filters are now totally excluded from the optimization problem. The consequence is that interference alignment can be achieved with a precoder design only, instead of a precoder and receiver filter design.

Since working with 2-norms is not straightforward, a modified objective function $\alpha$ is introduced and its upper bound is defined as follows:

$$\alpha = \sum_{k=1}^{K} \sum_{l=1,l \ne k}^{K} \sum_{m=1,m \ne \{l,k\}}^{K} \|P_{kl}-P_{km}\|_2^2 \le \tag{19}$$

$$\sum_{k=1}^{K} \sum_{l=1,l \ne k}^{K} \sum_{m=1,m \ne \{l,k\}}^{K} \|P_{kl}-P_{km}\|_F^2 = \alpha_{upper},$$

and instead of minimizing $\alpha$ the upper bound $\alpha_{upper}$ may be minimized so that the problem becomes:

$$(F_1, \ldots, F_k)_{opt} = \operatorname*{argmin}_{(F_1,\ldots,F_K)} \alpha_{upper} \text{ s.t. } F_l^H F_l = I_d, \forall l. \tag{20}$$

So far, it is not clear how the individual precoders affect the global objective function. Therefore, $\alpha_{upper}$ is reformulated as follows:

$$\alpha_{upper} = \sum_{l=1}^{K} \sum_{k \ne l} \sum_{m \ne \{l,k\}} \|P_{kl}-P_{km}\|_F^2$$

It can be seen that this reordering of the indices does not change the objective function. For fixed precoders $F_m$, $\forall m \ne l$, the optimal precoder $F_{l,opt}$ is chosen as follows:

$$F_{l,opt} = \operatorname*{argmin}_{F_l} \underbrace{\sum_{k \ne l} \sum_{m \ne \{l,k\}} \|P_{kl}-P_{km}\|_F^2}_{\alpha_{upper,l}}. \tag{21}$$

Note that the projector $P_{k,l}$ implicitly depends on the precoder $F_l$, while $P_{k,m}$ depends on the precoder $F_m$, $F_m$, $\forall m \ne l$. The local objective $\alpha_{upper,l}$ is expanded as follows:

$$\tag{22}$$

$$\alpha_{upper} = \sum_{k \ne l} \sum_{m \ne \{l,k\}} \|P_{kl}-P_{km}\|_F^2 = \sum_{k \ne l} \sum_{m \ne \{l,k\}} tr[(P_{kl}-P_{km})(P_{kl}-P_{km})^H]$$

$$= \sum_{k \ne l} \sum_{m \ne \{l,k\}} tr[P_{kl}-P_{kl}P_{km}-P_{kl}P_{km}+P_{km}]$$

$$= \sum_{k \ne l} \sum_{m \ne \{l,k\}} tr[P_{kl}-2P_{kl}P_{km}+P_{km}]$$

$$= \sum_{k \ne l} \sum_{m \ne \{l,k\}} tr[I_d - 2H_{kl}F_l(F_l^H H_{kl}^H H_{kl}F_l)^{-1}F_l^H H_{kl}^H P_{km}+P_{km}+I_d]$$

$$= 2d(K-1)(K-2) -$$

$$2\sum_{k \ne l} \sum_{m \ne \{l,k\}} tr\left[F_l^H H_{kl}^H P_{km} H_{kl}F_l(F_l^H H_{kl}^H H_{kl}F_l)^{-1}\right].$$

$\alpha_{upper,l}$ is composed of a sum of generalized Rayleigh quotients, whose minimizer does not have a closed form solution. Therefore, numerical techniques will be used, as is described below, to find a solution to the above problem.

The objective function $\alpha_{upper,l}$ is invariant to multiplication by both unitary and invertible matrices. More specifically, replacing $F_l$ in equation (22) by $F_l Q$ for any invertible $Q \in \mathbb{C}^{d \times d}$ yields:

$$\alpha_{upper,l}(F_l, Q) = 2d(K-1)(K-2) -$$
$$2 \sum_{k \neq l} \sum_{m \neq \{l,k\}} tr[Q^H F_l^H H_{kl}^H P_{km} H_{kl} F_l Q (Q^H F_l^H H_{kl}^H H_{kl} F_l Q)^{-1}] =$$
$$2d(K-1)(K-2) -$$
$$2 \sum_{k \neq l} \sum_{m \neq \{l,k\}} tr[Q^H F_l^H H_{kl}^H P_{km} H_{kl} F_l Q Q^{-1} (F_l^H H_{kl}^H H_{kl} F_l)^{-1} Q^{-H}] =$$
$$2d(K-1)(K-2) - 2 \sum_{k \neq l} \sum_{m \neq \{l,k\}} tr[F_l^H H_{kl}^H P_{km} H_{kl} F_l (F_l^H H_{kl}^H H_{kl} F_l)^{-1}] =$$
$$\alpha_{upper,l}(F_l).$$

It is noted that showing that equation (22) is invariant to multiplication by unitary matrices follows along the same line as above.

Thus, $\alpha_{upper,l}(F_l Q) = \alpha_{upper,l}(F_l)$ holds for any invertible or unitary $Q \in \mathbb{C}^{d \times d}$. The invariance to unitary rotations means that the optimal solution only depends on the subspace in which the precoder lies and not on the precoder itself. This very useful property of the objective function implies that it can be minimized on the complex Grassmann manifold of the space $\mathbb{C}^{M \times d}$. The complex Grassmann manifold of the $\mathbb{C}^{M \times d}$ (d<M) space is defined as the set of all d-dimensional complex subspaces of $\mathbb{C}^M$, as is described for example in J. H. Manton, "Optimization Algorithms Exploiting Unitary Constraints", IEEE Transactions on Signal Processing, vol. 50, no. 3, pp. 635-650, March 2002. Optimization on the Grassmann manifold leads to a reduction in the dimension of the optimization problem since points $F_l Q$ and $F_l$ become equivalent. Moreover, this implies that the objective yields an indefinite number of minimizers. In J. H. Manton, "Optimization Algorithms Exploiting Unitary Constraints", IEEE Transactions on Signal Processing, vol. 50, no. 3, pp. 635-650, March 2002, a systematic approach is presented to find a local minimum of f(X) on the Grassmann manifold subject to the constraint $X^H X = I$. This fits exactly to the problem at hand; thus, this approach was followed and optimal precoders were found using a modified steepest descent algorithm on the complex Grassmann manifold, as is described, for example, in section VII A of the above publication. The algorithm necessitates the evaluation of the objective function and its derivative with respect to the complex conjugate of the variable at each iteration. The derivative of $\alpha_{upper,l}$ w.r.t $F_l^*$ is provided as follows:

Given that $$\alpha_{upper} = 2d(K-1)(K-2) - \qquad (23)$$
$$2 \sum_{k \neq l} tr\left[F_l^H H_{kl}^H \left(\sum_{m \neq \{l,k\}} P_{km}\right) H_{kl} F_l (F_l^H H_{kl}^H H_{kl} F_l)^{-1}\right]$$
$$= 2d(K-1)(K-2) - 2 \sum_{k \neq l} tr[F_l^H A_k F_l (F_l^H B_k F_l)^{-1}],$$

with the implicitly defined and known quantities $A_k$ and $B_k$, then using the linearity property of the trace, sum and derivative operators in addition to the chain rule property, the derivative of $\alpha_{upper,l}$ w.r.t, $F_l^*$ is calculated as follows:

$$\frac{\partial \alpha_{upper,l}}{\partial F_l^*} = \frac{\partial \left(-2 \sum_{k \neq l} tr[F_l^H A_k F_l (F_l^H B_k F_l)^{-1}]\right)}{\partial F_l^*} \qquad (24)$$

$$= -2 \sum_{k \neq l} tr \frac{\partial [F_l^H A_k F_l (F_l^H B_k F_l)^{-1}]}{\partial F_l^*}$$

$$= -2 \sum_{k \neq l} tr\left[\frac{\partial (F_l^H A_k F_l)}{\partial F_l^*}(F_l^H B_k F_l)^{-1} - \right.$$
$$\left. F_l^H A_k F_l (F_l^H B_k F_l)^{-1} \frac{\partial (F_l^H B_k F_l)}{\partial F_l^*}(F_l^H B_k F_l)^{-1}\right]$$

$$= -2 \sum_{k \neq l} tr\left[\frac{\partial F_l^H}{\partial F_l^*} A_k F_l (F_l^H B_k F_l)^{-1} - \right.$$
$$\left. F_l^H A_k F_l (F_l^H B_k F_l)^{-1} \frac{\partial F_l^H}{\partial F_l^*} B_k F_l (F_l^H B_k F_l)^{-1}\right]$$

$$= -2 \sum_{k \neq l} tr\left[\frac{\partial F_l^H}{\partial F_l^*} A_k F_l (F_l^H B_k F_l)^{-1} - \right.$$
$$\left. \frac{\partial F_l^H}{\partial F_l^*} B_k F_l (F_l^H B_k F_l)^{-1} F_l^H A_k F_l (F_l^H B_k F_l)^{-1}\right]$$

$$= -2 \sum_{k \neq l} tr\left[\frac{\partial F_l^H}{\partial F_l^*}\left(-A_k F_l (F_l^H B_k F_l)^{-1} + \right.\right.$$
$$\left.\left. B_k F_l (F_l^H B_k F_l)^{-1} F_l^H A_k F_l (F_l^H B_k F_l)^{-1}\right)\right]$$

$$= -2 \sum_{k \neq l} [B_k F_l (F_l^H B_k F_l)^{-1} F_l^H A_k F_l - A_k F_l](F_l^H B_k F_l)^{-1},$$

where the last equation follows from K. B. Petersen and M. S. Pedersen, "The Matrix Cookbook", http:/matrixcookbook.com.

$$\frac{\partial tr(X^T C)}{\partial X} = tr\left(\frac{\partial X^T}{\partial X} C\right) = C.$$

The modified steepest descent algorithm on the Grassmann manifold for matrix variables is described in J. H. Manton, "Optimization Algorithms Exploiting Unitary Constraints", IEEE Transactions on Signal Processing, vol. 50, no. 3, pp. 635-650, March 2002, Section VII. It numerically minimizes a function f(X) subject to the orthogonality constraint $X^H X = I_d$, where $X \in \mathbb{C}^{M \times d}$ (d<M). It can only be used when the function f satisfies at least condition C1 or both conditions C1 and C2 presented below:

$$f(X) = f(XQ) \text{ for initary } Q \in \mathbb{C}^{d \times d} \qquad (C1)$$

$$f(X) = f(XQ) \text{ for invertible } Q \in \mathbb{C}^{d \times d} \qquad (C2)$$

The details of the algorithm are shown in FIG. 6.

The $qf_d$ factor is defined as follows: If X=QR is the QR decomposition of X, then qfd{X} is defined as the first d columns of Q.

To achieve interference alignment, embodiments of invention use an alternating minimization algorithm, where at each iteration one precoder is calculated using the steepest descent method and its corresponding projector matrices are updated. With the updated projector matrices, the next precoder is calculated and this continues until convergence. In other words, the receive interference subspaces are adjusted at each iteration until an alignment is reached. FIG. 7 shows the algorithm for interference alignment via minimizing projector distances of different subspaces in accordance with an embodiment of the present invention. By means of the algorithm described with regard to FIG. 7, interference alignment is achieved. For fixed precoders $F_m$, $\forall m \neq l$, an optimal precoder $F_{l,opt}$ is chosen as follows:

$$F_{l,opt} = \underset{F_l}{\mathrm{argmin}} \underbrace{\sum_{k \neq l} \sum_{m \neq \{l,k\}} \|P_{kl} - P_{km}\|_F^2}_{\alpha_{upper,l}}.$$

The index k refers to the receivers, while indices m,l refer to the transmitters. The projector $P_{kl}$ implicitly depends on precoder $F_l$, while the projector $P_{km}$ depends on precoder $F_m$. The solution $F_{l,opt}$ can be obtained using the steepest descent algorithm on the Grassmann manifold as described above. The algorithm of FIG. 7 assumes the constraint $F_l^H F_l = I_d$, and, therefore, the transmit power constraint is not satisfied. Therefore, the scaled precoder $F_l'$ is defined which is finally used for precoding the data symbols:

$$F_l' = F_l P_l, \tag{25}$$

where $P_l \in \mathbb{C}^{d \times d}$ is a diagonal matrix with diagonal elements equal to $$\sqrt{\frac{E_{tx,l}}{d}}.$$

This ensures that the power constraint is satisfied. Moreover, it does not ruin the alignment conditions due to the invariance of the local interference alignment objectives to multiplications by invertible matrices, as has been described above.

Equal power is allocated to each stream, assuming the CSI of the direct link between the k-th transmitter/receiver pair being not available. In case CSI is available, the optimal power allocation can be obtained according to the water-filling approach (WF), as for example described in E. Biglieri, R. Calderbank, A. Constantinides, A. Goldsmith, A. Paulraj and H. Vincent Poor, MIMO Wireless Communications, Cambridge University Press, 2007. If interference is perfectly aligned at each receiver, then it is sufficient to select the rows of $G_k$ to span the null-space of $(H_{k,l}F_l)^H$ for any $l \neq k$ in order to cancel interference; that is, $G_k$ is the zero-forcing (ZF) filter. It follows that $R_k$ can be simplified to.

$$R_k = \log_2 \det(I_d + \hat{H}_k \hat{H}_k^H (G_k^H C_{n_k} G_k)^{-1}) \tag{26}$$

With regard to the subsequently described results which are based on simulations, it is noted that equation (3) was still used in order to account for the case where interference is not perfectly aligned.

The invariants of the IA objective to multiplications by invertible matrices allows to write $F_l' = F_l Q_l$ and to perform an optimization over $Q_l$ to maximize equation (26):

$$Q_{l,opt} = \underset{Q_l}{\mathrm{argmax}} \log_2 \det\left(I_d + \hat{H}_k Q_l Q_l^H \hat{H}_k^H (G_k^H C_{n_k} G_k)^{-1}\right).$$

This is a standard W F problem whose solution is possible, for example on the basis of the approach described in E. Biglieri, R. Calderbank, A. Constantinides, A. Goldsmith, A. Paulraj and H. Vincent Poor, MIMO Wireless Communications, Cambridge University Press, 2007, so that it is not presented here for brevity.

As mentioned above, in accordance with the inventive approach, there are no restrictions on the receive filter, so that instead of the above-mentioned ZF filter, also a minimum mean squared error (MMSE) filter may be used. MMSE filters may be advantageous due to their better performance when compared to ZF filters, and they may be more robust to channel estimation errors. Even though an MMSE filter violates the IA conditions (see equation (4) above), its use results in higher achievable rates since it takes noise statistics into account. In this case, the filter expression is given by;

$$G_{mmse,k} = \left(\sum_{l=1}^{K} H_{kl} F_l F_l^H H_{kl}^H + C_{n_k}\right)^{-1} H_{kk} F_k. \tag{27}$$

The MMSE filter is derived as follows. As its name implies, an MMSE filter minimizes the mean squared error between the transmitted and the received symbols:

$$G_{mmse,k} = \underset{G_k}{\mathrm{argmin}} E[\|s_k - \hat{s}_k\|_2^2].$$

Given equation (1), then:

$$s_k - \hat{s}_k = (I_d - G_k^H H_{kk} F_k) s_k - G_k^H \sum_{l \neq k} H_{kl} F_l s_l - G_k^H n_k,$$

and consequently:

$$E[\|s_k - \hat{s}_k\|_2^2] =$$

$$tr[E[(s_k - \hat{s}_k)(s_k - \hat{s}_k)^H]] = tr\left[(I_d - G_k^H H_{kk} F_k)(I_d - G_k^H H_{kk} F_k)^H + \right.$$

$$G_k^H \sum_{l \neq k} H_{kl} F_l F_l^H H_{kl}^H G_k + G_k^H C_{n_k} G_k\right] =$$

$$tr\left[I_d - F_k^H H_{kk}^H G_k - G_k^H H_{kk} F_k + G_k^H \left(\sum_{l=1}^{K} H_{kl} F_l F_l^H H_{kl}^H + C_{n_k}\right) G_k\right] = \beta_k,$$

where $E[s_k s_l^H] = 0$, $\forall l \neq k$ (different symbols are uncorrelated) as well as $E[s_l n_k^H] = 0$, $\forall l, k$ (symbols and noise are uncorrelated) have been used. The objective function is convex in $G_k$; thus, the minimizer can be found by setting the derivative of the objective $\beta_k$ w.r.t. $G_k^*$ (or $G_k$) to 0:

$$\frac{\partial \beta_k}{\partial G_k^*} = 0 \Rightarrow -H_{kk} F_k + \left(\sum_{l=1}^{K} H_{kl} F_l F_l^H H_{kl}^H + C_{n_k}\right) G_k =$$

$$0 \Rightarrow G_{mmse,k} = \left(\sum_{l=1}^{K} H_{kl} F_l F_l^H H_{kl}^H + C_{n_k}\right)^{-1} H_{kk} F_k.$$

The approach in accordance with embodiments of the invention for achieving the interference alignment is an alternating minimization algorithm, with each iteration one precoder is calculated using the steepest descent method and its corresponding projector matrices are updated. With the updated projector matrices the next precoder is calculated and this continues until convergence.

Thus, embodiments of the invention allow for a CoMP approach calculating optimal precoding matrices in wireless cellular networks via minimizing the sum of distances of interference projectors. An iterative procedure may be used whereby at each iteration, the optimal precoding matrices are calculated based on exchanging the interference projector matrices between base stations. The calculation may be performed in a centralized unit or in a distributed way over the base stations necessitating signaling over the backhaul network which connects the base stations. The receive filters may be chosen according to the desired specifications, for example, they may be chosen to be MMSE, IRC or ZF filters.

In accordance with embodiments, the CSI between the receivers and undesired transmitters is available. As mentioned above, only a precoder design is necessitated to achieve interference alignment, in contrast to conventional methods in which both precoders and receive filters are part of the optimization process. Moreover, the algorithm may be implemented in a centralized as well as in a distributed fashion.

A distributed implementation necessitates that the updated projectors corresponding to the receive interference subspaces are exchanged between the transmitters. While conventional approaches necessitate the calculated receive filters to be signaled from the base station to the user side, which takes place over the air-link, the proposed method has no such requirements and thus results in less signaling over the air-link.

Figure 8:
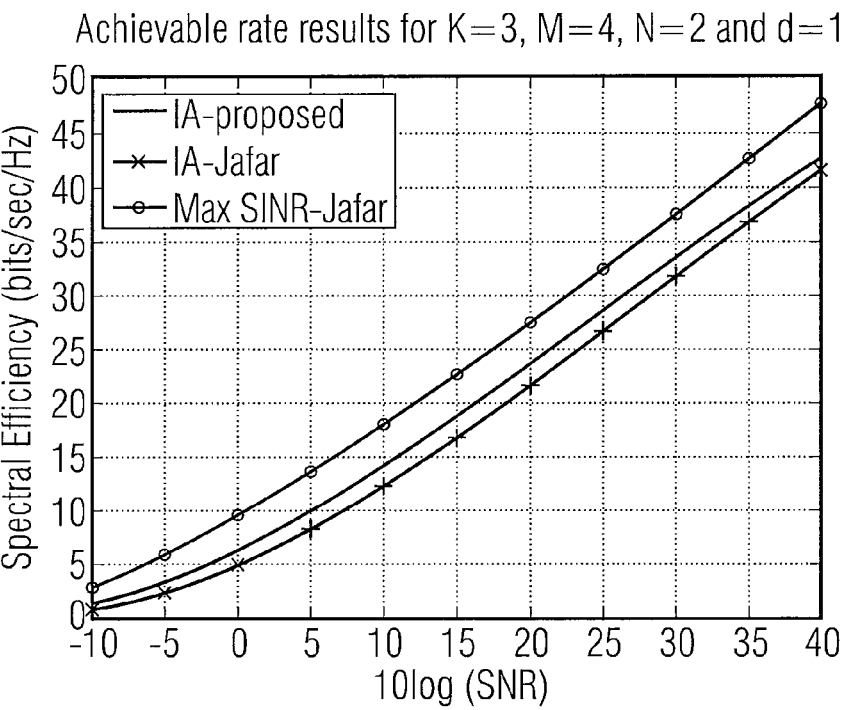
FIG. 8 is a graph showing the spectral efficiency results for a first scenario.
Figure 9:
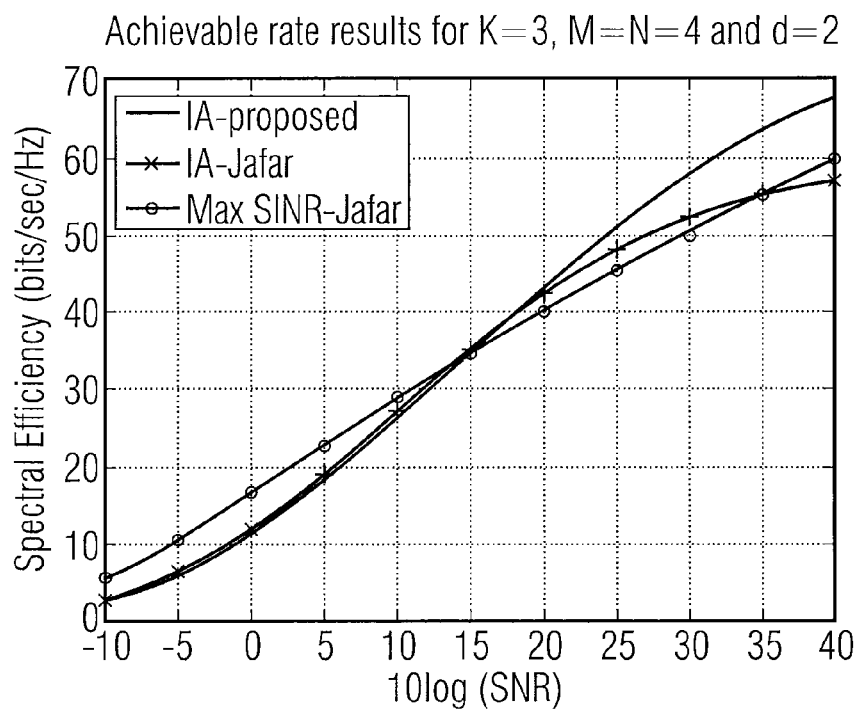
FIG. 9 is a graph showing the spectral efficiency results for a second scenario.

On the basis of the above-described embodiments, simulations were carried out, and simulation results were averaged over 500 independent and identically distributed (IID) generalizations with a mean O and covariance matrix I for both the direct links and the interfering links. This captures the performance at the cell-edge, where a user suffers from an interference as strong as the useful signal. The transmit power $E_{tx_i}=M$, $\forall l$. In a first scenario k=3, m=4, N=2, and d=1. According to an analysis that is described in C. M. Yetis, Gou Tiangao, S. A. Jafar and A. H. Kayran, "Feasibility Conditions for Interference Alignment", in IEEE Global Telecommunications Conference (GLOBECOM), 2008, IA is feasible for this scenario. FIG. 8 shows the spectral efficiency results for the first scenario. As can be seen, the inventive approach beats the IA algorithm via minimizing interference leakage, but has a lower performance than the Max-SINR algorithm. However, this is not a disadvantage, since the Max-SINR necessitates more signaling overhead. As discussed earlier, the latter necessitates complete channel knowledge, which means all nine channels have to be fed back to the transmitter. On the other hand, the remaining algorithms only necessitate the cross-links to be exchanged (six channels). In a second scenario k=3, m=4, n=4, and d=2. As described in C. M. Yetis, Gou Tiangao, S. A. Jafar and A. H. Kayran, "Feasibility Conditions for Interference Alignment", in IEEE Global Telecommunications Conference (GLOBECOM), 2008, again, this is a feasible IA scenario. FIG. 9 shows the spectral efficiency results for the second scenario. As is shown, the algorithm in accordance with embodiments of the invention beats both conventional algorithms starting at SNR of 13 dB, where $$SNR = SNR = \frac{E_{tx}}{tr(C_n)}$$

and it is assumed that noise statistics are similar at difference receivers for simplicity. It is assumed that this is the case because conventional algorithms are based on the concept of reverse networks, and, thus, a filter that improves IA quality or the SINR in one direction can ruin IA quality or the SINR in the other direction. Therefore, these algorithms can only find a local solution or not even reach one. A convergence proof for the IA scheme based on minimizing interference leakage was given, but no convergence proof was presented for the Max-SINR algorithm. On the other hand, the inventive approach can easily be shown to converge since it is an alternating minimizing algorithm.

Figure 10:
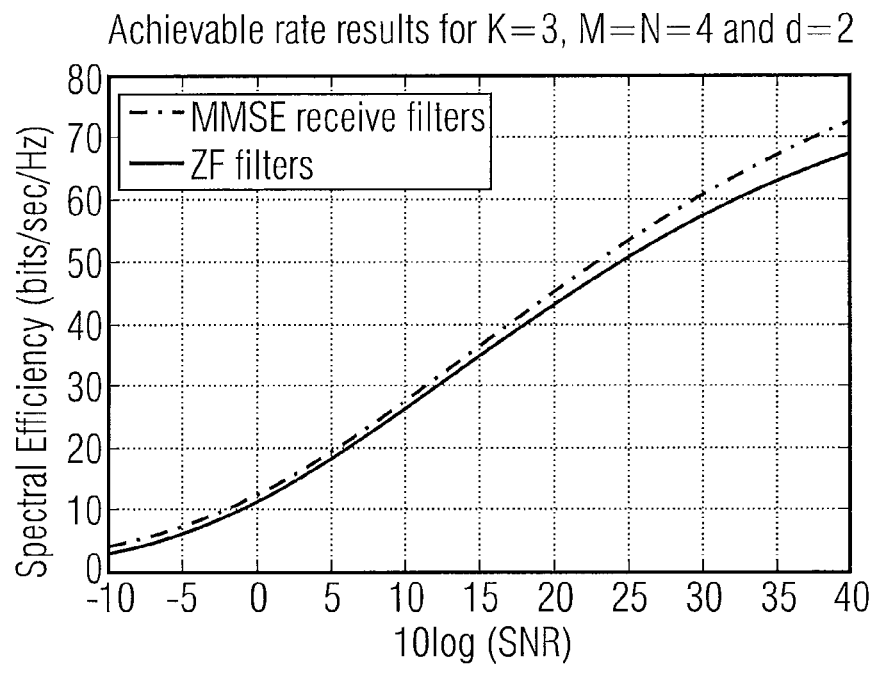
FIG. 10 is a graph showing the effect of using MMSE versus ZF filters on performance.

The above discussion assumes that a simple ZF filter was used at the receiver side. FIG. 10 shows the effect of using MMSE versus ZF filters on performance, assuming the above-mentioned second scenario. MMSE filters offer only small performance gains since perfect CSI at the transmitters is assumed. In more realistic scenarios, where only imperfect CSI is available at the transmitter side, MMSE filters are expected to offer a larger performance gain.

Figure 11:
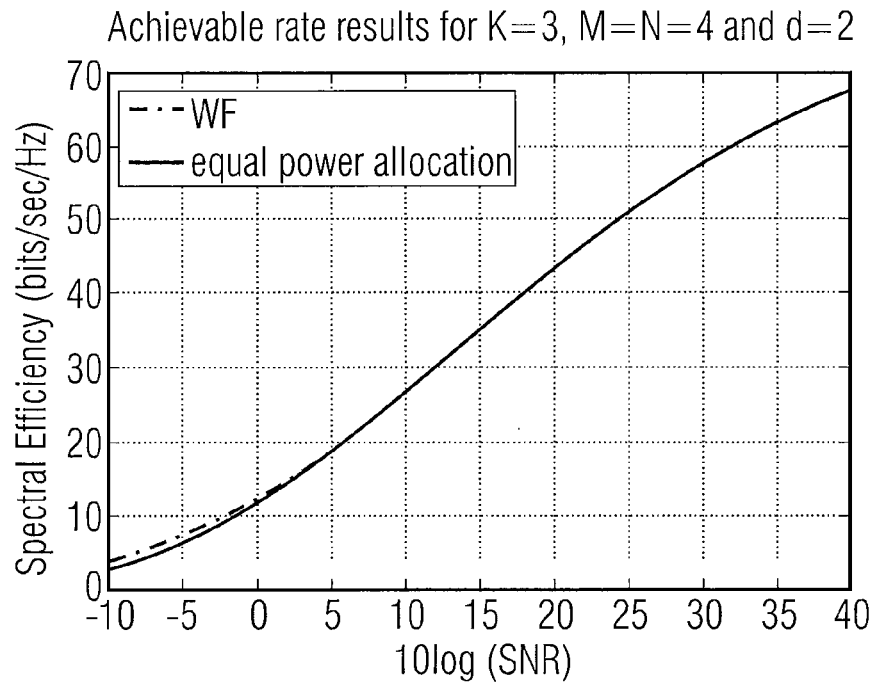
FIG. 11 is a graph showing the effect of WF on the performance.

FIG. 11 shows the effect of WF on the performance. As can be seen, WF provides gains in the low SNR scheme only; at medium and high SNR levels the WF algorithm performs as if equal power was allocated to the different streams.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Some embodiments according to the invention comprise a data carrier having electronically readable control signals, which are capable of cooperating with a programmable computer system, such that one of the methods described herein is performed. Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for reducing interference at a terminal of a wireless cellular network, the terminal experiencing interference from a plurality of interfering nodes in the wireless cellular network, the method comprising:
   selecting precoders of the interfering nodes such that a sum of distances between an interference projector matrices for the terminal is minimized,
   wherein an interference projector matrix corresponding to an interference subspace between an interfering node l and a terminal k is an orthogonal projector onto a column space of $H_{kl} F_l$,
   wherein
   $H_{kl}$=channel matrix of a channel between the interfering node l and the terminal k,
   $F_l$=precoder matrix of the interfering node l.

2. The method of claim 1, wherein the interference projector matrix corresponds to a unique receive interference subspace between the terminal and the interfering node.

3. The method of claim 1, wherein the interference projector matrix is a function of the precoder matrix of the interfering node and the channel matrix of the channel from the interfering node to the terminal.

4. The method of claim 1, wherein the interference projector matrix is determined as follows:
$$P_{kl}=H_{kl}F_l(F_l^H H_{kl}^H H_{kl} F_l)^{-1} F_l^H H_{kl}^H.$$

5. The method of claim 4, wherein the wireless cellular network comprises a plurality of terminals, and wherein the precoders are designed such that the sum of distances of the interference projector matrices over all terminals is minimized.

6. The method of claim 5, wherein the precoders of the interfering nodes are designed as follows:

$$(F_1, \ldots, F_K) = \underset{(F_1,\ldots,F_K)}{\operatorname{argmin}} [\text{sum of distances of interference projector matrices overall terminals}]$$

$$= \underset{(F_1,\ldots,F_K)}{\operatorname{argmin}} \sum_{k=1}^{K} \sum_{l=1,l\neq k}^{K} \sum_{m=1,m\neq\{l,k\}}^{K} \|P_{kl} - P_{km}\|^2$$

wherein
$F_1, \ldots, F_K$=precoder matrices of interfering nodes 1 to K,
$P_{kl}$=interference projector matrix corresponding to an interference subspace between an interfering node l and a terminal k,
$P_{km}$=interference projector matrix corresponding to an interference subspace between an interfering node m and the terminal k,
$\|P_{kl}-P_{km}\|_2$=distance between interference projector matrices.

7. A method for reducing interference at a terminal of a wireless cellular network, the terminal experiencing interference from a plurality of interfering nodes in the wireless cellular network, the method comprising:
   selecting precoders of interfering nodes such that a sum of distances between interference projector matrices for the terminal is minimized,
   wherein receive interference subspaces are adjusted iteratively until an alignment of the receive interference subspaces is reached,
   wherein the precoders are calculated by an alternating minimization algorithm,
   wherein at each iteration one precoder is calculated using a predefined method and its corresponding projector matrices are updated, wherein a next precoder is calculated based on the updated projector matrices, until convergence, and
   wherein for fixed precoders $F_m \forall m \neq l$, an optimal precoder $F_{l,opt}$ is chosen as follows:

$$F_{l,opt} = \underset{F_l}{\operatorname{argmin}} \sum_{k\neq l} \sum_{m\neq\{l,k\}} \|P_{kl} - P_{km}\|_F^2$$

wherein index k refers to the terminal, while indices l, m refer to the interfering nodes, wherein projector matrix $P_{kl}$ depends on precoder $F_l$, and wherein $P_{km}$ depends on precoder $F_m$, and wherein $\|P_{kl}-P_{km}\|_F$ is the Frobenius norm of $P_{kl}-P_{km}$.

8. The method of claim 7, wherein the nodes are connected over a backhaul network, and wherein an iterative calculation is performed in a central node of the wireless cellular network, or wherein the iterative calculation is distributed over a plurality of nodes of the wireless cellular network.

9. A method for reducing interference at a terminal of a wireless cellular network, the terminal experiencing interference from a plurality of interfering nodes in the wireless cellular network, the method comprising:
   selecting precoders of the interfering nodes such that a sum of distances between interference projector matrices for the terminal is minimized,
   wherein a receive filter in the terminal is selected independent of a design of the precoders at the interfering nodes, and
   wherein, dependent on a network specification, a minimum mean-square-error, an interference-rejection-combining or a zero-forcing receiving filter is chosen.

10. A non-transitory computer program product comprising instructions stored on a machine-readable medium for performing a method for reducing interference at a terminal of a wireless cellular network, the terminal experiencing interference from a plurality of interfering nodes in the wireless cellular network, the method comprising:
   selecting precoders of the interfering nodes such that a sum of distances between interference projector matrices for the terminal is minimized,
   when the instructions are executed on a computer,
   wherein an interference projector matrix corresponding to an interference subspace between an interfering node l and a terminal k is an orthogonal projector onto a column space of $H_{kl}F_l$, wherein $H_{kl}$=channel matrix of a channel between the interfering node l and the terminal k, $F_l$=precoder matrix of the interfering node l.

11. A wireless cellular network, comprising:
   a plurality of nodes; and
   a terminal experiencing interference from at least some of the plurality of nodes,
   wherein the wireless cellular network is configured to provide for a selection of precoders of nodes interfering with the terminal such that a sum of distances between interference projector matrices for the terminal is minimized,
   wherein an interference projector matrix corresponding to an interference subspace between an interfering node l and a terminal k is an orthogonal projector onto a column space of $H_{kl}F_l$,
   wherein
   $H_{kl}$=channel matrix of the channel between the interfering node l and the terminal k,
   $F_l$=precoder matrix of the interfering node l.

12. The wireless cellular network of claim 11, comprising:
   a backhaul network connecting the plurality of nodes,
   wherein the plurality of nodes are adapted to provide for a calculation of the precoders distributed among the plurality of nodes.

13. The wireless cellular network of claim 11, comprising:
   a central node; and
   a backhaul network connecting the plurality of nodes and the central node,
   wherein the central node is configured to provide for a centralized calculation of the precoders for the interfering nodes.

14. A node of a wireless cellular network, wherein the wireless cellular network comprises a terminal experiencing interference from the node and from one or more other interfering nodes in the network,
   wherein the precoders of the interfering nodes are selected such that the sum of distances between the interference projector matrices for the terminal is minimized, and
   wherein, after each iteration, the node is configured to calculate its precoder, to update its projector matrix accordingly, and to signal its updated projector matrix to all other interfering nodes.

15. A central node for a wireless cellular network comprising a plurality of nodes, a backhaul network connecting the plurality of nodes and the central node, and a terminal experiencing interference from a plurality of interfering nodes in the wireless cellular network, wherein the central node is configured to select precoders of the interfering nodes such that a sum of distances between interference projector matrices for the terminal is minimized,
   wherein an interference projector matrix corresponding to an interference subspace between an interfering node l and a terminal k is a orthogonal projector onto a column space of $H_{kl}F_l$,
   wherein
   $H_{kl}$=channel matrix of a channel between the interfering node l and the terminal k,
   $F_l$=precoder matrix of the interfering node l.

16. A non-transitory computer program product comprising instructions stored on a machine-readable medium for performing a method for reducing interference at a terminal of a wireless cellular network, the terminal experiencing interference from a plurality of interfering nodes in the wireless cellular network, the method comprising:
   selecting precoders of the interfering nodes such that a sum of distances between interference projector matrices for the terminal is minimized, when the instructions are executed on a computer,
   wherein receive interference subspaces are adjusted iteratively until an alignment of the receive interference subspaces is reached,
   wherein the precoders are calculated by an alternating minimization algorithm, wherein at each iteration one precoder is calculated using a predefined method and its corresponding projector matrices are updated,
   wherein a next precoder is calculated based on the updated projector matrices, until convergence, and
   wherein for fixed precoders $F_m \forall m \neq l$, an optimal precoder $F_{l,opt}$ is chosen as follows:

$$F_{l,opt} = \underset{F_l}{\operatorname{argmin}} \sum_{k \neq l} \sum_{m \neq \{l,k\}} \|P_{kl} - P_{km}\|_F^2$$

wherein index k refers to the terminal, while indices l, m refer to the interfering nodes, wherein projector matrix $P_{kl}$ depends on precoder $F_l$, and wherein $P_{km}$ depends on precoder $F_m$, and wherein $\|P_{kl}-P_{km}\|_F$ is a Frobenius norm of $P_{kl}-P_{km}$.

17. A non-transitory computer program product comprising instructions stored on a machine-readable medium for performing a method for reducing interference at a terminal of a wireless cellular network, the terminal experiencing interference from a plurality of interfering nodes in the wireless cellular network, the method comprising:
   selecting precoders of the interfering nodes such that a sum of distances between interference projector matrices for the terminal is minimized, when the instructions are executed on a computer,
   wherein a receive filter in the terminal is selected independent of a design of the precoders at the interfering nodes, and
   wherein, dependent on a network specification, a minimum mean-square-error, an interference-rejection-combining or a zero-forcing receiving filter is chosen.

18. A wireless cellular network, comprising:
   a plurality of nodes; and
   a terminal experiencing interference from at least some of the plurality of nodes,
   wherein the wireless cellular network is configured to provide for a selection of precoders of nodes interfering with the terminal such that a sum of distances between interference projector matrices for the terminal is minimized,
   wherein receive interference subspaces are adjusted iteratively until an alignment of the receive interference subspace is reached,
   wherein the precoders are calculated by an alternating minimization algorithm, wherein at each iteration one precoder is calculated using a predefined method and its corresponding projector matrices are updated, wherein a next precoder is calculated based on the updated projector matrices, until convergence, and
   wherein for fixed precoders $F_m \forall m \neq l$, an optimal precoder $F_{l,opt}$ is chosen as follows:

$$F_{l,opt} = \underset{F_l}{\operatorname{argmin}} \sum_{k \neq l} \sum_{m \neq \{l,k\}} \|P_{kl} - P_{km}\|_F^2$$

wherein index k refers to the terminal, while indices l, m refer to the interfering nodes, wherein projector matrix $P_{kl}$ depends on precoder $F_l$, and wherein $P_{km}$ depends on precoder $F_m$, and wherein $\|P_{kl}-P_{km}\|_F$ is a Frobenius norm of $P_{kl}-P_{km}$.

19. A wireless cellular network, comprising:
a plurality of nodes; and
a terminal experiencing interference from at least some of the plurality of nodes,
wherein the wireless cellular network is configured to provide for a selection of precoders of nodes interfering with the terminal such that a sum of distances between interference projector matrices for the terminal is minimized,
wherein a receive filter in the terminal is selected independent of a design of the precoders at the interfering nodes, and
wherein, dependent on a network specification, a minimum mean-square-error, an interference-rejection-combining or a zero-forcing receiving filter is chosen.

20. A central node for a wireless cellular network comprising: a plurality of nodes, a backhaul network connecting the plurality of nodes and a central node, and a terminal experiencing interference from a plurality of interfering nodes in the wireless cellular network, wherein the central node is configured to select precoders of the interfering nodes such that a sum of distances between interference projector matrices for the terminal is minimized,
wherein receive interference subspaces are adjusted iteratively until an alignment of the receive interference subspace is reached,
wherein the precoders are calculated by an alternating minimization algorithm, wherein at each iteration one precoder is calculated using a predefined method and its corresponding projector matrices are updated, wherein the next precoder is calculated based on an updated projector matrices, until convergence, and
wherein for fixed precoders $F_m \forall m \neq l$, an optimal precoder $F_{l,opt}$ is chosen as follows:

$$F_{l,opt} = \underset{F_l}{\operatorname{argmin}} \sum_{k \neq l} \sum_{m \neq \{l,k\}} \|P_{kl} - P_{km}\|_F^2$$

wherein index k refers to the terminal, while indices l, m refer to the interfering nodes, wherein projector matrix $P_{kl}$ depends on precoder $F_l$, and wherein $P_{km}$ depends on precoder $F_m$, and wherein $\|P_{kl-Pkm}\|_F$ is a Frobenius norm of $P_{kl}-P_{km}$.

21. A central node for a wireless cellular network comprising a plurality of nodes, a backhaul network connecting the plurality of nodes and the central node, and a terminal experiencing interference from a plurality of interfering nodes in the wireless cellular network, wherein the central node is configured to select precoders of the interfering nodes such that a sum of distances between interference projector matrices for the terminal is minimized,
wherein a receive filter in the terminal is selected independent of a design of the precoders at the interfering nodes, and
wherein, dependent on a network specification, a minimum mean-square-error, an interference-rejection-combining or a zero-forcing receiving filter is chosen.

* * * * *